(12) United States Patent
Liu et al.

(10) Patent No.: US 8,762,409 B2
(45) Date of Patent: *Jun. 24, 2014

(54) EMBEDDED BUSINESS METADATA

(71) Applicant: AT&T Intellectual Property 1, L.P., Atlanta, GA (US)

(72) Inventors: Zhu Liu, Marlboro, NJ (US); Andrea Basso, Marlboro, NJ (US); Lee Begeja, Gillette, NJ (US); Daivd C. Gibbon, Lincroft, NJ (US); Bernard S. Renger, New Providence, NJ (US); Behzad Shahraray, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/768,437

(22) Filed: Feb. 15, 2013

(65) Prior Publication Data

US 2013/0159343 A1      Jun. 20, 2013

Related U.S. Application Data

(63) Continuation of application No. 12/287,095, filed on Oct. 6, 2008, now Pat. No. 8,407,202.

(51) Int. Cl.
*G06F 7/00* (2006.01)
*G06F 17/30* (2006.01)

(52) U.S. Cl.
USPC ........... 707/770; 707/771; 707/779; 707/709; 707/765

(58) Field of Classification Search
CPC ............. G06F 17/30864; G06F 17/30867; G06F 17/30696; G06Q 30/0601; G06Q 30/0603; Y10S 707/99933; Y10S 707/948

USPC .......................................... 707/770
See application file for complete search history.

(56) References Cited

U.S. PATENT DOCUMENTS

| | | | |
|---|---|---|---|
| 6,256,623 B1 | 7/2001 | Jones | |
| 6,792,113 B1 | 9/2004 | Ansell et al. | |
| 7,363,309 B1* | 4/2008 | Waite et al. | 1/1 |
| 7,379,949 B2* | 5/2008 | Chowdhury | 1/1 |
| 7,428,530 B2* | 9/2008 | Ramarathnam et al. | 1/1 |
| 7,571,321 B2 | 8/2009 | Appenzeller et al. | |
| 7,783,624 B2* | 8/2010 | Martinez et al. | 707/709 |
| 7,996,282 B1* | 8/2011 | Scott et al. | 705/27.2 |
| 8,001,138 B2* | 8/2011 | Cloward | 707/765 |
| 8,073,867 B2* | 12/2011 | Chowdhury | 707/771 |
| 2005/0228780 A1* | 10/2005 | Diab et al. | 707/3 |
| 2006/0173813 A1* | 8/2006 | Zorola | 707/2 |
| 2007/0098178 A1 | 5/2007 | Raikar | |
| 2008/0040359 A1* | 2/2008 | Arrouye et al. | 707/100 |
| 2008/0172368 A1* | 7/2008 | Chowdhury et al. | 707/3 |
| 2008/0244408 A1* | 10/2008 | King et al. | 715/719 |
| 2008/0312814 A1* | 12/2008 | Broadbent et al. | 701/200 |

(Continued)

*Primary Examiner* — Binh V Ho

(57) ABSTRACT

A methodology is disclosed for improving searches of a distributed Internet network. A distributed Internet network is searched for a particular information type, searching for a field identified using a predetermined identifier indicating that the field comprises information of the particular information type. When the field identified using the predetermined identifier is found, an association of the contents of the field with the search results is made, and repeated using the same predetermined identifier. Information of a particular information type may then be served in a field identified using a predetermined identifier that identifies the field as containing information of the particular information type.

18 Claims, 3 Drawing Sheets

(56) References Cited

U.S. PATENT DOCUMENTS

| | | | |
|---|---|---|---|
| 2009/0222444 A1* | 9/2009 | Chowdhury et al. | 707/5 |
| 2009/0233548 A1 | 9/2009 | Andersson et al. | |
| 2010/0017366 A1* | 1/2010 | Robertson et al. | 707/3 |
| 2010/0036822 A1* | 2/2010 | Riley et al. | 707/3 |
| 2010/0082590 A1* | 4/2010 | Nye | 707/706 |
| 2010/0114882 A1* | 5/2010 | Wiegering et al. | 707/728 |

* cited by examiner

EMBEDDED BUSINESS METADATA

PRIORITY CLAIM

This application is a continuation of co-pending application Ser. No. 12/287,095, entitled "EMBEDDED BUSINESS METADATA," filed Oct. 6, 2008, the disclosure of which is incorporated in its entirety herein.

FIELD OF THE INVENTION

The present invention relates generally to electronic business advertising services and e-commerce, and more particularly, to methods for improving searches of a distributed Internet network, such as the World Wide Web, and other services accessible over the Internet.

BACKGROUND OF THE INVENTION

Finding relevant, accurate business information on the Web in an efficient manner can still be a challenge. While a variety of national, regional and local Web sites and portals provide basic information for consumers, those sites have many shortcomings. For example, a consumer can find basic information about restaurants such as restaurant type, street address, phone number and hours of operation with just a few keystrokes or mouse clicks. Additional information, which can be critical to selecting a restaurant, is more difficult or just impossible to determine without an extensive search of the establishment's Web site. For example, a consumer may wish to know about payment options, availability of a kids menu, approximate price range, dress code or the daily specials. A phone call to the restaurant may be necessary to clearly answer all the questions. That becomes impractical when even only a few possible restaurants are identified by a quick search.

Search engines such as Google™ and Yahoo!® search for information on the Web. The information may be Web pages, images and other types of files. The search function generally includes three steps: visiting and caching Web pages, Web indexing and presenting search results to the user.

Search engines may employ a Web crawler, an automated program that browses the Web to constantly search or crawl and return the most recent revision of pages encountered to be copied or cached. The dynamic nature of the Web is that pages are constantly being added, changed or deleted. Once pages are cached, they can be processed with an algorithm or algorithms to rank or index them. That process is referred to as Web indexing, with the purpose of optimizing speed and performance when a specific search request is made. Web pages are typically crawled with some frequency such as daily, weekly or monthly, which can lead to outdated or incorrect information being returned by a search.

Web pages are designed to be viewed or read by people. However, during the process of indexing the Web pages, words, context and intended meaning may be inadvertently changed or lost as a result of the indexing process itself. Natural language processing is the study of the problems of automated generation and understanding of natural human language. Indexing algorithms must accurately capture the intended meaning of pages they encounter or the indexing will be inaccurate, ultimately leading to inaccurate search results presented back to the user.

Metadata is defined as "data about data," of any sort, in any media. Metadata may describe an individual data item in a database (DB) such as an individual customer name or account number, or a collection of data such as an entire customer record as determined by its context and how it may be used. Metadata can be used to speed up and improve a quality of a search by saving the users from performing more complex query filter operations manually.

The use of metadata can improve Web indexing by providing context or otherwise improving the understanding of the data. Metadata, however, is frequently used by Web page designers to provide unseen key words or phrases to search algorithms. That data is not really "data about data" at all. Many search engines now have algorithms to screen out such extraneous metadata. The screening algorithms are not infallible, so there can be instances where inappropriate results may be presented that have escaped the best efforts of the Web indexing algorithms.

A tag is metadata in the form of a user-selected word or term associated with or assigned to a piece of information. The tag describes that information. This is in contrast to hierarchical systems that use traditional "tree" structures where folder and sub-folder arrangements are used. Tagging allows users to quickly and easily attach multiple tags, and change or delete tags. Both data and metadata can be tagged. For example, computer files, audio files, video files or playlists, Web sites, Web pages, Internet bookmarks of favorite Web sites and many other data types may be tagged. A Web page hosted on a Web server or blog server that supports tagging, might have the tags "Baseball," "Yankees," "Tickets," "Away Games," and "Discounts." A human reader may be able to tell the purpose of the page by quickly scanning the list of tags, in this case discounted Yankees baseball tickets for an away game.

Specially designed server software may be used for tracking, updating and facilitating searching with tags, and utilizing suitable algorithms to improve the efficiency and effectiveness of multiple-tag searches. In this example, the server software may display the tags in a list on a page, with each tag displayed as a Web link leading to an index page listing all Web pages that use that tag. This could allow a reader to quickly locate pages that have been associated with a tag or group of tags. If the author of the Web page would like to change the way the page is found through a search, the list of tags can be changed.

While using tags in such an organizational system is flexible and easy, tagging is not without its drawbacks. Typically there is no information about the meaning or semantics of a tag. For example, the tag "Lab" could refer to a Labrador retriever, a national lab such as Los Alamos National Lab or any company or person with "lab" in their name. This lack of semantic distinction in tags can lead to inappropriate connections between items yielding inappropriate search results. Additionally, selection of tag terms is largely non-standardized and may be user specific. Users may use drastically different terms to describe the same concept. Users of tagging systems must make judgments, based on the number of connections and the choices of tag terms and whether possible connections between items are valid for their particular use or interests.

Tag classification and the concept of connecting sets of tags between Web/blog servers, has led to the rise of "folksonomy" classification, the concept of social bookmarking, and other forms of online communities and social networking software. Folksonomy is defined as the method of collaboratively creating and managing tags to annotate and categorize links and/or content. Larger-scale folksonomies tend to address some of the problems of tagging, as astute users of tagging systems will monitor/search the current use of tag terms within these systems, and tend to use existing tags in order to easily form connections to related items. In this way, evolving folksonomies define a set of tagging conventions through eventual group consensus.

Although tagging is often promoted as an alternative to organization by a hierarchy of categories, more and more online resources use a hybrid or mixed system, where items are organized into broad categories, with finer classification distinctions being made by the use of tags.

vCard is a file format for electronic business cards. vCards are exchanged electronically, and are often attached to email messages or copied from the Web. The format has provisions for name and address information, phone numbers, URLs, logos, photographs, audio clips and more.

It would therefore be desirable to provide a technique for searching distributed Internet networks for a particular information type, while minimizing or eliminating unwanted or incorrect search results. There is furthermore a need for more focused searching techniques that yield results that are difficult to obtain using a natural language or traditional tag search. To the inventors' knowledge, no such system or method currently exists.

SUMMARY OF THE INVENTION

In accordance with a first aspect of the present invention, there is disclosed a method for searching for data in a distributed Internet network. The method generally comprises the steps of: receiving a searching target, the searching target comprising a particular information type; searching a first served information grouping for a field identified using a predetermined identifier indicating that the field comprises information of the particular information type; if a field identified using the predetermined identifier is found in the first served information grouping, and the field contains the searching target, then associating contents of the first served information grouping with the search results; and repeating the searching and associating steps with other served information groupings using the same predetermined identifier.

In accordance with a second aspect of the present invention, there is disclosed a method for serving data in a distributed Internet network. The method generally comprises the steps of: receiving a request for information; and serving information of a particular information type, the information being served in a field identified using a predetermined identifier that identifies the field as containing information of the particular information type.

These aspects of the invention and further advantages thereof will become apparent to those skilled in the art as the present invention is described with particular reference to the accompanying drawings.

DESCRIPTION OF THE INVENTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
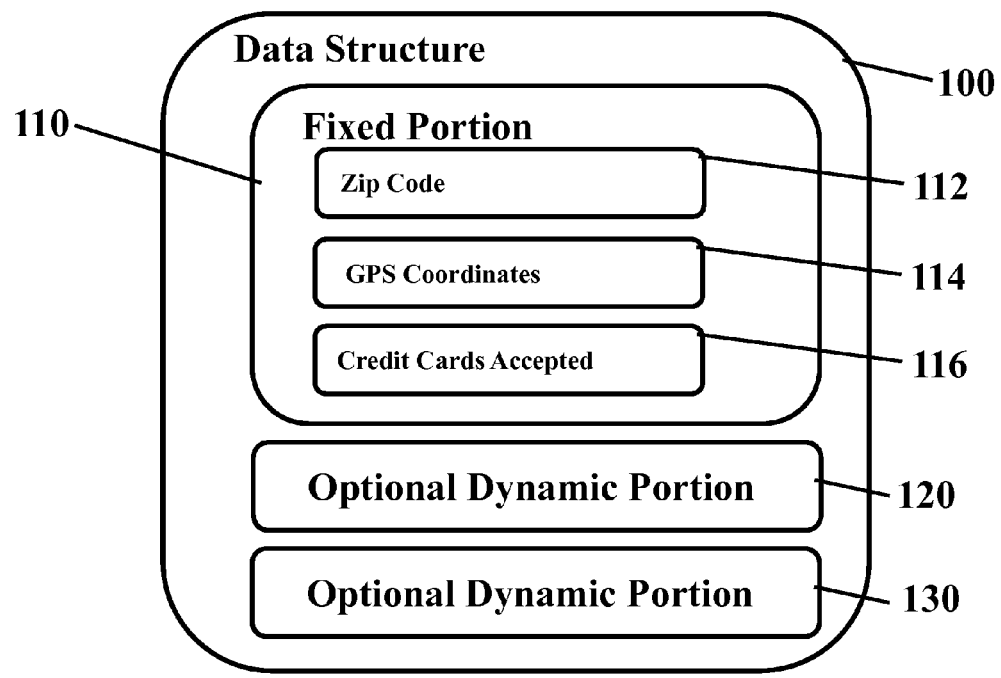
FIG. 1 is a block diagram embodiment of an exemplary data structure in accordance with an aspect of the present invention.

The present invention provides methods for improving distributed Internet network searches. FIG. 1 is a block diagram embodiment of an exemplary file format or data structure 100 in accordance with an aspect of the present invention. The exemplary data structure 100 is a Web page that is computer readable but may also be human readable like a typical Web page. In the exemplary embodiment, the data structure relates to a particular business or organization. One skilled in the art will recognize that the structure may alternatively relate to any topic that might be a target of a network search.

A portion 110 of the data structure 100 contains information types that remain relatively fixed. Examples of information types that may be stored in the fixed portion 110 include business name, business category, business subcategory (one or multiple categories), physical address/city/zip code, mailing address/city/zip code, global positioning system coordinates, operating hours, credit cards accepted, phone number, fax number, Web site, preferred contact method, products/services provide, specialty, brands, payment options, languages spoken, certification & affiliation, to name a few.

Each information type within the fixed portion 110 is identified within the file format by a predetermined identifier. The predetermined identifier is standardized to facilitate searching. The fixed portion 110 and predetermined identifiers 112, 114 and 116 may or may not be visible on the Web page by human viewers.

The predetermined identifiers indicate that a portion or field within the fixed portion 110 contains information of a particular information type. The predetermined identifiers may be in the form of markup language tags, key words, a database address and field location. They may utilize hyper text markup language (HTML) or extensible markup language (XML). Identifier 112, 114 and 116 are examples of predetermined identifiers specifying where particular information types are located. In this example, Zip code, GPS coordinates and credit cards accepted can be found in locations identified by identifiers 112, 114 and 116 respectively.

The portions 120 and 130 of the data structure 100 are dynamic in nature in that they may change with some frequency. The information contained in those locations may change as it relates to the ongoing activities of the business or organization. Predetermined identifiers are also used in those areas to improve searching. Portion 120 of the data structure 100 contains optional dynamic business-provided data. For example, a business may place data in portion 120 relating to specials, discounts, reservations or appointments, waiting times, tickets and the like as makes sense for the business or organization.

Portion 130 of the data structure 100 contains dynamic user-provided data. Predetermined identifiers are also used in those areas to improve searching. For example, a user may choose to place feedback or tags in portion 130, relating to his experience with the business or organization (satisfied, unsatisfied, etc.), review(s), accuracy and relevance of information provided, etc.

A search agent may be utilized to process and compile search data and present it to a device of the user's choosing.

The search agent may be comprised of hardware and/or software, including machine readable code which when executed by a processor and/or memory, implements the intended functionality. The search agent may be a stand-alone program or application, or be part of a service the user pays for on an as-used basis or as part of an ongoing subscription. The search agent may be Web-browser based. Alternatively, the agent may be embedded in a portable device that accesses the network through various channels (wired or wireless networks, etc.).

The data structure 100 in accordance with the present invention facilitates efficient, relevant and accurate Web searches by utilizing the predetermined identifiers. For example, a user is at Fisherman's Wharf in San Francisco, Calif., and is interested in locating a seafood restaurant within walking distance (say half a mile), that accepts a particular credit card, is moderately priced, has an informal dress code and is open until 1:00 AM. Using conventional Web searching techniques, it is likely that multiple searches would be required on national, regional or local Web sites and even on individual restaurant Web sites. Even after all this searching, answers to the individual requirements posed by the user may remain unanswered. Trying to make an informed comparison and dining decision with limited information and possibly erroneous information will likely be difficult, time consuming and unreliable.

Ambiguity problems inherent in current Web searching methods are therefore eliminated by the use of predetermined identifiers. Faster and more accurate searching can be facilitated as timely updates to a data structure 100 are made, providing the most up-to-date information instead of searching archived or cached data and possibly performing complex natural language processing, tag searching or searching, processing and compiling of Web pages directly. The present invention can provide near-real time information which is not available with current Web searching methods.

The present invention permits businesses or organizations that have temporal data to enable users to access the data to help them make informed and timely decisions. For example, an airline or movie theater could provide timely updates to changing seat availability up to departure/show time, on a real-time or near-real-time basis. That information is marked by the standardized predetermined identifiers of the invention, and information from several airlines can therefore be conveniently compared. Similarly, restaurants may make wait times available to keep users informed as they make dining decisions. A mobile food service cart or truck service providing meals or snacks could provide updates as to its location as this can change from day-to-day or even hour-to-hour. A restaurant could also provide updates as to a daily special or soup of the day, as they may also change with some frequency. The predetermined identifiers of the present invention permit that information to be found and compared in near-real-time, without relying on Web crawlers to compile the data.

In another embodiment, a search agent and delivery service may encrypt part or all of the data structure, thereby limiting access. For example, access to sensitive financial information, such as a bank account or investment portfolio, or personal information, such as physical address, email address or personal phone number, may be restricted. Access may then be granted only with appropriate permission and security as established by the service providing the information.

In one example, a restaurant or nightclub may wish to promote an upcoming event with special privileges reserved for VIP club members. By encrypting business-provided data in the data structure, access to the VIP information may be limited to registered VIP members who then use a provided decryption key, for example, via a VIP email or SMS message. Similarly, information services, such as a subscription-only database, an employment service or a dating service, may utilize encryption of portions of the data structure to grant various levels of access to information. The access may depend on the subscription level selected and/or other safety measures put in place to safeguard entrusted intellectual property, proprietary information, client information and/or personal information.

In yet another embodiment, a notification of a change to a data structure 100 is sent by the business or organization owning or maintaining the data structure to a search engine or search agent, alerting them of changes in a timely way. Where data is updated frequently, such as daily, hourly, or by the minute, that technique assures that the most current information is returned in a search.

Figure 2:
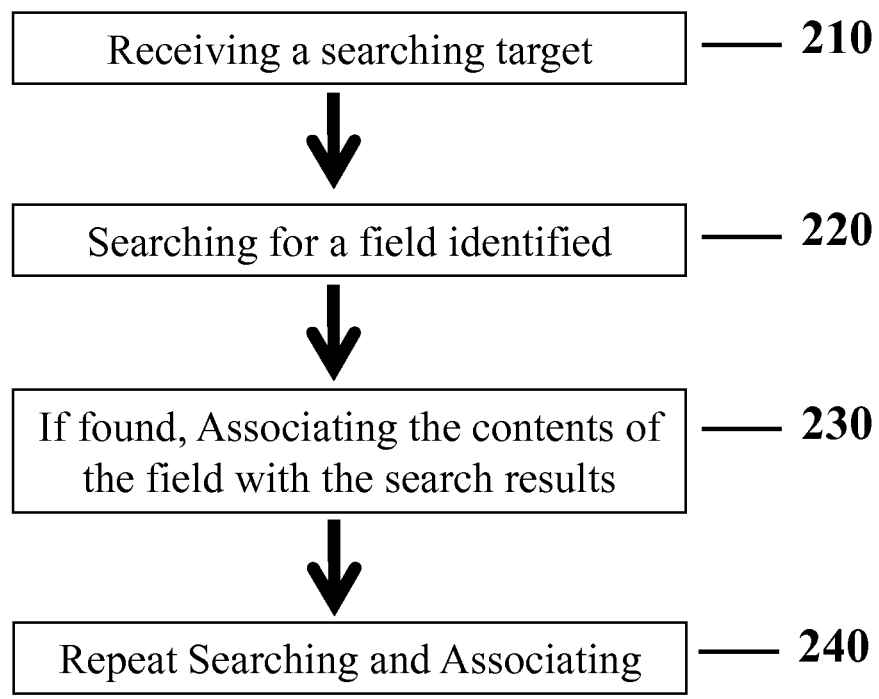
FIG. 2 is a flow chart depicting a method for searching for data in accordance with the present invention.

FIG. 2 is a flow chart depicting a method 200 for searching for data in accordance with the present invention. In step 210, a searching target is received, the target comprising a particular information type. The particular information type is chosen from a predetermined list of information types that are each associated with one or more predetermined identifiers. Examples of information type may include business name, business category, business subcategory (one or more categories), physical address/city/zip code, mailing address/city/zip code, global positioning system coordinates and others.

In step 220, a search is made. A first served information grouping is searched for a field identified using a predetermined identifier indicating that the field comprises information of the particular information type. An example of that search could be searching the Zip code field for a particular Zip code, such as 94133 for Fisherman's Wharf, San Francisco, Calif. The predetermined identifier unambiguously identifies information in the indicated field as being the particular information type. No natural language interpretation is necessary.

In step 230, if a field identified using the predetermined identifier is found in the first served information grouping, and that field contains the searching target, then an association is made between the contents of the field and the search results. Using the Zip code 94133 example, when a field identified by a predetermined identifier for Zip codes is found, and that field contains 94133, an association is made between the Web site containing the field and the search results. For example, Web sites containing 94133, identified as a Zip code, are added to a result list. On the other hand, if a Web site contains "94133" in another context, such as a street number or a phone number, that Web site would not be added to the search results on that basis.

In step 240, the searching and associating steps are repeated in other served information groupings using the same predetermined identifier. An example of this step would include continuing to search and associate using zip code 94133 and associating as appropriate.

Figure 3:
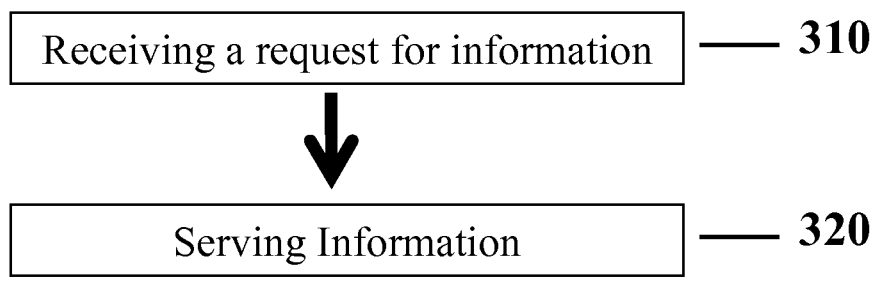
FIG. 3 is a flow chart depicting a method for serving data in accordance with the present invention.

FIG. 3 is a flow chart depicting a method 300 for serving data in accordance with the present invention. In step 310, a request for information is received. An example of this is a search request for restaurants which serve seafood located in the Zip code of 94133 (Fisherman's Wharf, San Francisco, Calif.). In that case, the predetermined identifier is "Zip code."

In step 320, information of a particular information type is served in a field identified using a predetermined identifier that identifies the field as containing information of the particular information type: i.e. "Zip codes." The served information therefore unambiguously contains a Zip code. A search engine or agent can use the information directly, without interpretation or parsing.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A method for searching for data in a distributed Internet network, the method comprising:
    receiving a searching target from a subscriber, the searching target comprising a plurality of target information items and, associated with each target information item, an indication that the target information item is of one of a plurality of particular information types;
    receiving a plurality of served information groupings from a plurality of separate information servers located in the distributed Internet network;
    searching each of the plurality of served information groupings for fields identified using predetermined identifiers standardized among the separate information servers, the predetermined identifiers indicating that the identified fields comprise information of the particular information types associated with the target information items, the predetermined identifiers included in the served information groupings;
    determining that a first field in a first served information grouping is identified using a first predetermined identifier;
    determining that a subscription level of the subscriber permits access to the information in the first field;
    decrypting the information contained in the first field using a private key;
    determining that the first field contains one of the target information items;
    associating contents of the first served information grouping with search results;
    wherein, for each information grouping, at least one of the identified fields contains dynamic information relating to sales promotions of a business associated with the information grouping; and
    transmitting the search results to the subscriber.

2. The method of claim 1, wherein the distributed Internet network is the World Wide Web.

3. The method of claim 2, wherein the served information groupings are Web sites.

4. The method of claim 1, wherein the predetermined identifiers are tags.

5. The method of claim 1, wherein the predetermined identifiers are markup language tags.

6. The method of claim 1, wherein the predetermined identifiers are database addresses.

7. The method of claim 1, wherein the predetermined identifiers are field locations.

8. The method of claim 1, wherein the particular information types are business characteristics.

9. The method of claim 1, wherein, for each information grouping, at least one of the identified fields contains fixed geographical information about a business associated with the information grouping.

10. A non-transitory computer-usable medium having computer readable instructions stored thereon for execution by a processor to perform a method for searching for data in a distributed Internet network, the method comprising:
    receiving a searching target from a subscriber, the searching target comprising a plurality of target information items and,
    associated with each target information item, an indication that the target information item is of one of a plurality of particular information types;
    receiving a plurality of served information groupings from a plurality of separate information servers located in the distributed Internet network;
    searching each of the plurality of served information groupings for fields identified using predetermined identifiers standardized among the separate information servers, the predetermined identifiers indicating that the identified fields comprise information of the particular information types associated with the target information items, the predetermined identifiers included in the served information groupings;
    determining that a first field in a first served information grouping is identified using a first predetermined identifier;
    determining that a subscription level of the subscriber permits access to the information in the first field; decrypting the information contained in the first field using a private key;
    determining that the first field contains one of the target information items;
    associating contents of the first served information grouping with search results;
    wherein, for each information grouping, at least one of the identified fields contains dynamic information relating to sales promotions of a business associated with the information grouping; and
    transmitting the search results to the subscriber.

11. The non-transitory computer-usable medium of claim 10, wherein the distributed Internet network is the World Wide Web.

12. The non-transitory computer-usable medium of claim 11, wherein the served information groupings are Web sites.

13. The non-transitory computer-usable medium of claim 10, wherein the predetermined identifiers are tags.

14. The non-transitory computer-usable medium of claim 10, wherein the predetermined identifiers are markup language tags.

15. The non-transitory computer-usable medium of claim 10, wherein the predetermined identifiers are database addresses.

16. The non-transitory computer-usable medium of claim 10, wherein the predetermined identifiers are field locations.

17. The non-transitory computer-usable medium of claim 10, wherein the particular information types are business characteristics.

18. The non-transitory computer-usable medium of claim 10, wherein, for each information grouping, at least one of the identified fields contains fixed geographical information about a business associated with the information grouping.

* * * * *